US009742861B2

(12) United States Patent
Harrang et al.

(10) Patent No.: US 9,742,861 B2
(45) Date of Patent: Aug. 22, 2017

(54) FRACTIONAL PRE-DELIVERY OF CONTENT TO USER DEVICES FOR UNINTERRUPTED PLAYBACK

(71) Applicant: Opanga Networks, Inc., Seattle, WA (US)

(72) Inventors: Jeffrey Paul Harrang, Seattle, WA (US); Giles Westerfield, Seattle, WA (US); John Burnette, Seattle, WA (US); David Gibbons, Seattle, WA (US)

(73) Assignee: OPANGA NETWORKS, INC., Seattle, WA (US)

( * ) Notice: Subject to any disclaimer, the term of this patent is extended or adjusted under 35 U.S.C. 154(b) by 211 days.

(21) Appl. No.: 14/549,450

(22) Filed: Nov. 20, 2014

(65) Prior Publication Data
US 2015/0142910 A1    May 21, 2015

Related U.S. Application Data

(60) Provisional application No. 61/906,791, filed on Nov. 20, 2013, provisional application No. 61/969,200, filed on Mar. 23, 2014.

(51) Int. Cl.
*H04L 29/08* (2006.01)
*G06F 17/30* (2006.01)

(52) U.S. Cl.
CPC .......... *H04L 67/2842* (2013.01); *G06F 17/30* (2013.01); *H04L 67/2847* (2013.01)

(58) Field of Classification Search
CPC .................................................. H04L 67/2842
See application file for complete search history.

(56) References Cited

U.S. PATENT DOCUMENTS

| 7,978,711 | B2 * | 7/2011 | Harrang | H04H 20/42 370/231 |
| 8,949,452 | B2 * | 2/2015 | Harrang | H04L 65/4023 370/232 |
| 9,172,643 | B2 * | 10/2015 | Harrang | H04L 47/10 |
| 9,363,185 | B2 * | 6/2016 | Harrang | H04L 43/0888 |
| 9,378,508 | B2 * | 6/2016 | Burnette | G06Q 30/0201 |
| 2003/0063072 | A1 * | 4/2003 | Brandenberg | G01S 5/02 345/173 |

(Continued)

FOREIGN PATENT DOCUMENTS

EP    2605144 A1    6/2013

OTHER PUBLICATIONS

Luan et al.; 2010; IEEE; Impact of network dynamics on users video quality.*

(Continued)

*Primary Examiner* — Backhean Tiv

(57) ABSTRACT

Systems and methods for delivering fractions of content to user devices before the content is selected or requested (e.g., a pre-delivery of content) are described. In some embodiments, the systems and methods receive an indication that content is available for pre-delivery from a content server to a user device over a network, determine a fraction (e.g., size) of the content available for pre-delivery that satisfies one or more predicted content playback conditions, and causes the determined fraction of the content available for pre-delivery to be delivered to the user device.

19 Claims, 6 Drawing Sheets

(56) References Cited

U.S. PATENT DOCUMENTS

| | | | |
|---|---|---|---|
| 2003/0172374 A1 | 9/2003 | Vinson et al. | |
| 2006/0143668 A1* | 6/2006 | Du Breuil | H04N 7/17318 725/89 |
| 2008/0155120 A1* | 6/2008 | Argawal | H04L 67/104 709/242 |
| 2010/0174735 A1* | 7/2010 | Fiatal | G06F 17/30106 707/769 |
| 2010/0198943 A1* | 8/2010 | Harrang | H04L 1/0002 709/217 |
| 2010/0228799 A1* | 9/2010 | Hutton | G06F 3/0607 707/822 |
| 2010/0274871 A1* | 10/2010 | Harrang | H04L 1/0002 709/217 |
| 2011/0060708 A1* | 3/2011 | Suzuki | G06N 99/005 706/12 |
| 2012/0123774 A1* | 5/2012 | Choi | H04L 49/90 704/228 |
| 2013/0117349 A1* | 5/2013 | Burnette | G06Q 30/0201 709/202 |
| 2013/0124679 A1 | 5/2013 | Harrang et al. | |
| 2013/0246803 A1* | 9/2013 | Vale | H04L 65/4084 713/189 |
| 2014/0221084 A1* | 8/2014 | Morrison, III | H04L 67/32 463/29 |
| 2014/0280702 A1* | 9/2014 | Barker | H04N 21/2402 709/217 |
| 2014/0362830 A1* | 12/2014 | Verger | H04W 36/0072 370/332 |
| 2015/0142910 A1* | 5/2015 | Harrang | H04L 67/2842 709/213 |
| 2015/0207691 A1* | 7/2015 | Price | H04L 67/2847 709/217 |

OTHER PUBLICATIONS

International Search Report and Written Opinion for PCT/US2014/066710, filed Nov. 20, 2014.

Tom H. Luan et al. "Impact of Network Dynamics on User's Video Quality: Analytical Framework and QoS Provision", IEEE Transactions on Multimedia, Jan. 2010, p. 64-78, vol. 12, No. 1, IEEE.

Extended European Search Report for EP Application No. 14863206.0 dated Apr. 5, 2017.

* cited by examiner

FRACTIONAL PRE-DELIVERY OF CONTENT TO USER DEVICES FOR UNINTERRUPTED PLAYBACK

CROSS-REFERENCES TO RELATED APPLICATIONS

This application claims priority to U.S. Provisional Application No. 61/906,791, filed on Nov. 20, 2013, entitled METHOD AND SYSTEM FOR FRACTIONAL FILE PRE-DELIVERY and U.S. Provisional Application No. 61/969,200, filed on Mar. 23, 2014, entitled METHOD AND SYSTEM FOR FRACTIONAL FILE PRE-DELIVERY, which are hereby incorporated by reference in their entirety.

BACKGROUND

Many user devices include and support a varied suite of mobile applications, or "apps," enabling users to download and install many different applications to their user devices. The different applications, some of which include components configured to present content to users, may have different or custom online content interfaces and retrieval/delivery protocols. Additionally, the applications may request for and receive content (e.g., video content, audio content, and so on) from various different online, networked, and/or remote content sources, such as content delivery networks (CDNs), remote content servers, remote content storage sites, and so on.

Content is often delivered from remote content servers or associated edge caches to requesting devices (e.g., mobile or other user devices) over a network. Typically, a content provider or other network component utilizes cache controllers and associated algorithms to determine the content delivered to user devices that should be cached, such as content that is predicted to be popular, viral, and/or often requested by user devices. Therefore, when a user device requests delivery of a popular piece of content, the content provider, via the network edge cache, is able to quickly respond and deliver the requested content to the user device from the network edge cache that is proximate to the requesting user device.

Often, the delivery of content to a user device from a remote content source is less than optimal, especially when the user wishes to immediately consume the content. For example, the delivery of content from a remote server to a user device may be slow or ineffective due to limitations at the content source, in the delivery network, at the user device, and so on.

SUMMARY

Systems and methods for delivering fractions of content to user devices before the content is selected for presentation or playback and/or requested for consumption (e.g., a pre-delivery of content) are described. In some embodiments, the systems and methods receive an indication that content is available for pre-delivery from a content server to a user device over a network, determine a fraction (e.g., size) of the content available for pre-delivery that satisfies one or more predicted content playback conditions, and causes the determined fraction of the content available for pre-delivery to be delivered to the user device.

For example, the systems and methods may determine the fraction of content by selecting a fractional size of the content that is associated with an uninterrupted playback probability of the content paired with a delivery buffer cumulative credit function (CCF) on a cumulative-distribution function (CDF) curve, where the CDF curve represents a relationship between predicted uninterrupted playback percentages for new content to be pre-delivered to the user device and outputs of the delivery buffer cumulative credit function for content previously delivered to the user device.

In some embodiments, the systems and methods may receive an indication that content is available for pre-delivery from a content server to a user device over a network, determine a fraction of the content to be pre-delivered to the user device that is based on a probability that the content to be pre-delivered to the user device will be consumed without interruptions or stalls by the user device during a playback event and based on a prediction of a delivery network via which the content is to be delivered to the user device during the playback event, and cause the determined fraction of the content available for pre-delivery to be delivered to the user device.

DETAILED DESCRIPTION

Figure 1:
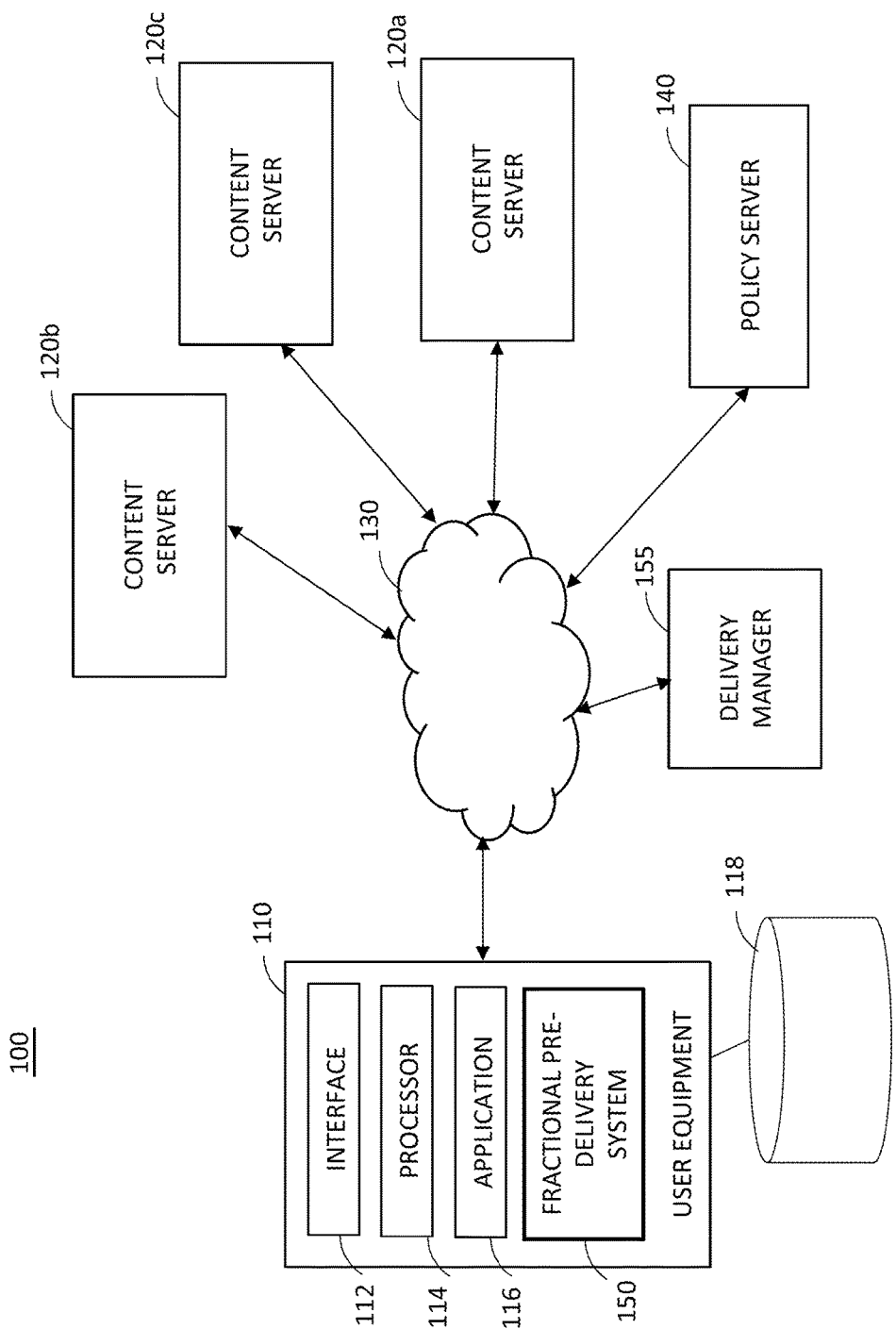
FIG. 1 is a block diagram illustrating a suitable computing environment.

Systems and methods for delivering fractions, portions, or other increments of content to user devices, before the content is selected or requested (e.g., a pre-delivery of content), are described. In some embodiments, the systems and methods include a fractional pre-delivery system that determines a fraction of content to be pre-delivered to the user device that is based on a probability that the content to be pre-delivered to the user device will be consumed without interruptions or stalls by the user device during a playback event (e.g., a probability based on past delivery and viewing performance of other streamed content) and/or based on a prediction of a delivery network via which the content is to be delivered to the user device during the playback event, and causes the determined fraction of the content available for pre-delivery to be delivered to the user device.

For example, a user (e.g., a consumer) is associated with a smart phone that includes a client or application configured to pre-deliver content to the smart phone. In the background, the client monitors and/or predicts past, current, and future network related conditions. When desired content becomes available for delivery, the client selects the best time to transfer the content (e.g., a fraction of the content) based on a set of policy rules. In some embodiments, the determined fraction of content and other remaining fractions or portions of selected content are pre-delivered into local device storage at chosen times, in one or several separate delivery sessions. Later, after the pre-delivery is completed, when the user selects a content file, an associated application may immediately access the fraction of the content that has been pre-delivered to the local storage of the user device, and begins playing the content using the local copy of the fraction of content. Because the fraction of the content is locally stored, the user experiences an instant and reliable playback of content that is seemingly located at a remote content storage location.

Thus, the systems and methods may employ various algorithmic processes to conditionally determine an optimum or suitable fraction of a content file to pre-deliver into local end device storage. For example, if an unsuitably large fraction of a content file is pre-delivered, and the content is not later viewed by a user (starting with the pre-delivered portion), the pre-delivery of the content may be inefficient and a wasteful use of computing and network resources. Also, if an unsuitably small fraction of a content file is pre-delivered then, and a user does initiate a play request for the content, the delivery network may be unable to deliver the remaining fractions of the content file during playback of the pre-delivered fraction, which may result in a stall, interruption, or pause (e.g., due to buffer exhaustion) of the playback of the content, which degrades the user viewing experience, among other drawbacks. The systems and methods described herein, therefore, enable the determination of a suitable or optimum pre-delivery fraction of content files, in order to achieve certain delivery criteria and playback experiences resulting from an optimized transfer of content files to a user device, among other benefits.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

FIG. 1 is a block diagram illustrating a suitable network environment 100 for the fractional delivery of content to user devices, such as the fractional pre-delivery of content to user devices. The network environment 100 includes one or more user equipment or user devices 110, one or more content servers 120a-c, and a policy server 140 that communicate with one another over a data communication network 130.

Any of the machines, databases, or devices shown in FIG. 1 may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices. For example, the policy server 140 and the content servers 120a-c may be combined as a single server (e.g., one content server that provides the functionality of delivering content and monitoring and applying pre-delivery policy conditions).

The content servers 120a-c may provide a variety of different media and other content types, such as video content (e.g., movies, television shows, news programming, video clips), image content (e.g., image or picture slideshows), audio content (e.g., radio programming, music, podcasts), and so on. The content servers 120a-c may deliver, transfer, transport, and/or otherwise provide media files and other content to network edge caches (not shown), which may deliver, transfer, transport, and/or otherwise provide the content to requesting devices (e.g., user equipment 110a-c) via various media transfer protocols (e.g., Hypertext Transfer Protocol (HTTP), File Transfer Protocol (FTP), HTTP Live Streaming (HLS), HTTP Dynamic Streaming (HDS), HTTP Smooth Streaming (HSS), Dynamic Adaptive Streaming over HTTP (DASH), Real Time Streaming Protocol (RTSP), and so on).

The network 130 may be any network that enables communication between or among machines, databases, and devices. Accordingly, the network 130 may be a wide access network (WAN), wired network, a fiber network, a wireless network (e.g., a mobile or cellular network), a cellular or telecommunications network (e.g., WiFi, Global System for Mobile Communications (GSM), Universal Mobile Telecommunications System (UMTS), Long Term Evolution (LTE) network), or any suitable combination thereof. The network 130 may include one or more portions of a private network, a public network (e.g., the Internet), or any suitable combination thereof.

The user equipment 110 may include various types of user devices, such as mobile devices (e.g., laptops, smart phones, tablet computers, and so on), computing devices, set-top boxes, vehicle computing devices, gaming devices, and so on. The user equipment 110a-c may support and run various different operating systems, such as Microsoft® Windows®, Mac OS®, iOS®, Google® Chrome®, Linux®, Unix®, or any other mobile operating system, including Symbian®, Palm®, Windows Mobile®, Google® Android®, Mobile Linux®, and so on.

The user equipment 110 may also support various components configured to request, receive, display, and/or present content to users associated with the user equipment 110. For example, the user equipment 110 may include applications 116, such as an app, browser, or other component that sends requests for content to content servers 120a-c and presents received content to the users via various display or presentation components, such as a user interface 112. The user equipment 110 may also include a processor 114 and local storage or caches 118, such as a local cache or data store that stores received content (e.g., pre-delivered or device cached content) and provides the stored content to the requesting applications 112. A local cache or storage 118 may be, for example, a storage or memory component contained by the user equipment 110, a detachable storage component that may be attached to the user equipment 110, a storage device associated with a local access network (LAN) that includes the user equipment 110, and/or other storage locations or devices that store media, files, and other data for the user equipment 110 (e.g., a storage location or device that provides storage and is accessible only by a certain or associated user equipment 110).

In some embodiments, the user equipment 110 collects and stores a local application inventory list and application usage data, and provides or transmits application information to the policy server 140, information identifying one or more applications resident on the user equipment 110. For example, the user equipment 110 may transmit an application information file, which includes information identifying applications 116 resident on the user equipment 110 and application usage information identifying historical usage of the applications resident on the user equipment 110.

The user equipment 110 may periodically inventory the applications 116 currently installed on the user equipment 110. For example, the user equipment 110 may query the operating system (OS) of the user equipment 110 or an application registration service employed by the user equipment 110 to obtain a list of unique identifiers for the applications installed and resident on the user equipment 110. In some cases, the user equipment 110 may generate the list of unique identifiers by inspecting the storage 118 of the user equipment 110, such as by searching for executable files having known names.

Further details regarding the discovery of available content and/or pre-delivery of content may be found in commonly-assigned and co-pending U.S. patent application Ser. No. 14/335,826, filed on Jul. 18, 2014, entitled CONTENT SOURCE DISCOVERY, commonly-assigned and co-pending U.S. patent application Ser. No. 14/212,934, filed on Mar. 14, 2014, entitled PRE-DELIVERY OF CONTENT TO DEVICES, and commonly-assigned and co-pending U.S. patent application Ser. No. 14/448,876, filed on Jul. 31, 2014, entitled PRE-DELIVERY OF CONTENT TO A USER DEVICE, which are hereby incorporated by reference in their entirety.

In some embodiments, the network environment 100 may include a delivery manager 155, which directs or otherwise manages the delivery of content between devices, such as from the content servers 120a-c to the user equipment 110, from the user equipment 110 to the content servers 120a-c, between user equipment, between content servers (e.g., from content server 120b to content server 120c), and so on. The delivery manager 155 may, when instructed, track, store, and/or provide information associated with various network delivery policies and/or protocols utilized during the delivery of content over the network 130. Although the delivery manager 155 is depicted as being separate from the content servers 120a-c, any of the content servers 120a-c, the policy server 140, and/or the user equipment 110 may include some or all components of the delivery manager 155. Additionally, in some configurations, the delivery manager 155 and/or the content servers 120a-c may include some or all components of the policy server 140.

In some embodiments, the delivery manager 155 directs or manages the delivery of content via a delivery policy that utilizes or uses surplus network bandwidth or surplus network capacity. A surplus of network bandwidth or network capacity may be network bandwidth or network capacity that is determined to be available idle or free) in a network in view of the total capacity of the network and/or and the total usage of the network. In some embodiments, a network provider determines the amount of surplus network capacity available in a network in view of the total capacity of the network and/or and the total usage of the network. The surplus network capacity may be determined statically or dynamically, and, therefore, a determined surplus network capacity for a network may vary substantially and/or randomly over time (e.g., during peak use periods), for long or short time scales, and/or between one service provider to another.

The surplus capacity, therefore, may be the free bandwidth or capacity between an actual and/or current usage of the bandwidth and a total capacity (or, a predetermined percentage of the total capacity). Therefore, the delivery manager 155 may direct or manage the delivery of content between content providers 120a-c, network edge caches (not shown), and user equipment 110 over various selected delivery policies or protocols that utilize free, available, idle, or otherwise surplus bandwidths or capacities of networks, such as paths or protocols that deliver data over currently underused networks that would not otherwise be in use, and/or without substantially impacting or altering the transport performance associated with other data traffic sharing the network.

Further details regarding the delivery of content using surplus network capacity may be found in commonly-assigned U.S. Pat. No. 7,500,010, issued on Mar. 3, 2009, entitled ADAPTIVE FILE DELIVERY SYSTEM AND METHOD, U.S. Pat. No. 8,589,585, issued on Nov. 19, 2013, entitled ADAPTIVE FILE DELIVERY SYSTEM AND METHOD, U.S. Published Patent Application No. 2010/0198943, filed on Apr. 15, 2010, entitled SYSTEM AND METHOD FOR PROGRESSIVE DOWNLOAD USING SURPLUS NETWORK CAPACITY, and U.S. Published Patent Application No. 2013/0124679, filed on Jan. 3, 2013, entitled SYSTEM AND METHOD FOR PROGRESSIVE DOWNLOAD WITH MINIMAL PLAY LATENCY, all of which are hereby incorporated by reference in their entirety.

In some embodiments, the user equipment 110 includes a fractional pre-delivery system 150 that includes components configured to select and cause fractional pre-delivery of content items, such as content items identified via information (e.g., a manifest file) provided by the policy server 140, which stores information associated with pre-delivery policy conditions, mobile applications, content sources, and available content, and provides a customized manifest file to the user equipment 110 that is based on the custom configuration of the applications resident on the user equipment 110.

As described herein, the fractional pre-delivery system 150 may determine a suitable or optimum fraction (e.g., size) of a content file to be pre-delivered to user equipment 110. For example, the fractional pre-delivery system 150 may determine a fraction of content to be pre-delivered to the user device that is based on a probability that the content to be pre-delivered to the user device will be consumed by the user device during a playback event (e.g., a probability based on past delivery and viewing performance of other streamed content) and/or based on a prediction of a delivery network via which the content is to be delivered to the user device during the playback event, and causes the determined fraction of the content available for pre-delivery to be delivered to the user device In some embodiments, the fractional pre-delivery system 150 may include or be part of a device-resident content pre-delivery software client that detects one or combinations of past, current and/or future (predicted) conditions of the network 130 or networks linking the user equipment 110 with the remote content servers 120a-c. The fractional pre-delivery system 150 may evaluate or compare the network conditions against a set of determined policy rules stored at the policy server 140 or within local storage 118, and determine when to pre-deliver fractions of content to the user equipment 110 based on the comparisons. Further details regarding the components and/or processes performed by the fractional pre-delivery system 150 are described herein.

Examples of Delivering Fractions of Content to User Devices

Figure 2:
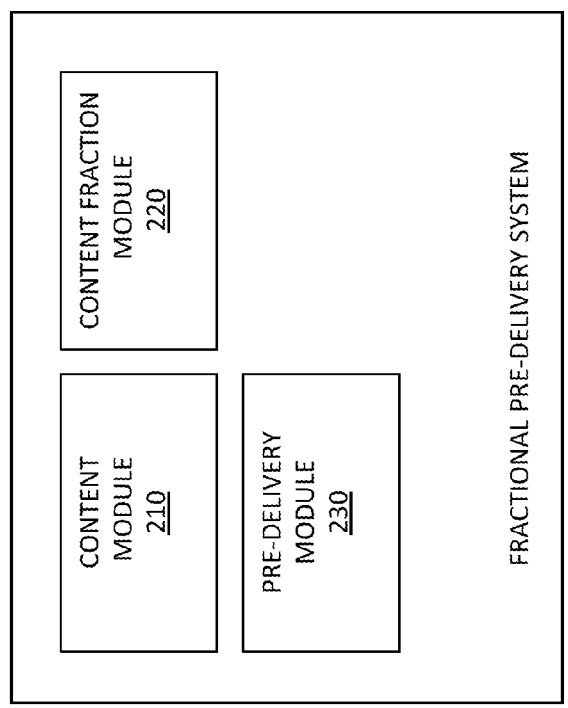
FIG. 2 is a block diagram illustrating components of a fractional pre-delivery system.

As described herein, in some embodiments, the fractional pre-delivery system 150 determines a fraction of content to pre-deliver to a user device, and causes delivery of the determined fraction. FIG. 2 is a block diagram illustrating the components of the fractional pre-delivery system 150.

The fractional pre-delivery system 150 may include one or more modules and/or components to perform one or more operations of the fractional pre-delivery system 150. The modules may be hardware, software, or a combination of hardware and software, and may be executed by one or more processors. For example, the fractional pre-delivery system 150 may include a content module 210, a content fraction module 220, and a pre-delivery module 230.

In some embodiments, the content module 210 is configured and/or programmed to receive an indication that content is available for pre-delivery from a content server to a user device over a network. For example, the content module 210 may receive information from the policy server 140 that identifies content items available for pre-delivery to the user device 110, such as content items at the remote content servers 120a-c and associated with mobile applications 116 of the user device 110 that play multimedia content (e.g., video, audio, and so on), and/or may identify available content items as part of a pre-delivery client of the user device. As described herein, the pre-delivery of content is a delivery of content to the user device before a user of the user device inputs a request to retrieve or play back the content via the user device (e.g., pre-delivery of content anticipates the user selecting the content at a later, future, time).

In some embodiments, the content fraction module 220 is configured and/or programmed to determine a fraction of the content available for pre-delivery that satisfies one or more predicted content playback conditions or probabilities. The one or more predicted content playback conditions or probabilities may include a probability that the content to be pre-delivered to the user device will be consumed and/or presented to the user without interruptions or stalls by the user device during a playback event.

For example, the content fraction module 220 may determine consumption credit function values associated with tracking a content delivery buffer of the user device that is associated with a consumption of content pre-delivered to the user device with a consumption credit function, generate a cumulative-distribution function (CDF) curve that plots the determined consumption credit function values versus uninterrupted playback probabilities associated with the user device, and select a fractional size of the content that is associated with a desired uninterrupted (e.g., no stalls) playback probability using the CDF curve.

In other words, the content fraction module 220 determines a fractional size of the content that is associated with a predicted playback percentage of the content paired with a delivery buffer cumulative credit function (CCF) on a cumulative-distribution function (CDF) curve, where the CDF curve represents a relationship between predicted uninterrupted playback percentages for new content to be pre-delivered to the user device and outputs of the delivery buffer cumulative credit function for content previously delivered to the user device.

As described herein, the content fraction module 220 determines the size of the content fraction that will be pre-delivered to the user device, in order to pre-deliver a suitable and/or optimum content fraction that is not too large or too small. Thus, the content fraction module 220 performs various algorithmic processes to determine a fraction size that enables playback reliability (e.g., no stalls or interruptions during playback) during future content playback events, and prevents or minimizes the inefficient use of device storage memory of pre-delivered content. The content fraction module 220 may perform and/or utilize the following techniques when determining the size of the content fraction to pre-deliver to the user device.

In some embodiments, the pre-delivery client (which may include the content fraction module 220) monitors each occurrence of a playback event or session at the user device, where a playback event or session begins at the pre-delivery of a portion of content to the user device and ends when the playback of the pre-delivered portion of the content is finished and content that has been delivered during the playback event begins to play back. The pre-delivery client, therefore, monitors and tracks a playback performance that corresponds to the portion of a content file that is streamed in real-time while a playback event is in progress, utilizing a delivery buffer cumulative credit function (CCF) when tracking the performance. The delivery buffer cumulative credit function is defined as follows:

$$C(t) = \text{BytesDelivered}(t) - \text{BytesConsumed}(t),$$

where BytesDelivered is the number of file content bytes delivered to an application (e.g., an application configured to play back content streamed from a remote source and/or locally fetched content) performing the playback event since commencement of the playback event, and BytesConsumed is the number of file content bytes used by the application during an assumed continuous playback event (e.g., the number of bytes that the application would consume if the assumed delivery rate were equal to or greater than the consumption rate).

For example, $C(t)$ at $t=0$ would be equal to 0, as no bytes would be delivered, and no bytes would be consumed, and $C(t)$ at $t=t$ would be a positive number when the number of bytes delivered from $t=0$ to $t=t$ is greater than the number of bytes assumed to be consumed during the playback event, which, in general, is equal to the encoding rate of the played back content (e.g., the average encoding rate) times the duration of the playback at $t=t$. Thus, in some embodiments, the cumulative credit function (CCF) emulates the filling status of a virtual, notional delivery buffer when the content is streamed to the user device during a playback event of the content (e.g., streamed during the play back of the content from local device storage).

A value of the CCF, therefore, represents a status of the playback event and/or a status of the content within the virtual delivery buffer, assuming no-predelivered bytes. For example, the CCF value is positive when the content delivery rate consistently exceeds the playback or consumption rate, negative when the content delivery rate is consistently less than the playback or consumption rate, or zero when the content delivery rate is equal to the playback or consumption rate. The pre-delivery client may sample the CCF various playback intervals, such as at regular (e.g., every 1 second) intervals, at aperiodic (e.g., an average of every 1 second) intervals, and so on, and records the CCF value samples in a database (e.g., database 118) for many playback events or sessions. In some embodiments, the delivery of content during a playback event may be discontinuous with pauses in the requests for content to the remote content server 120a.

Figure 3:
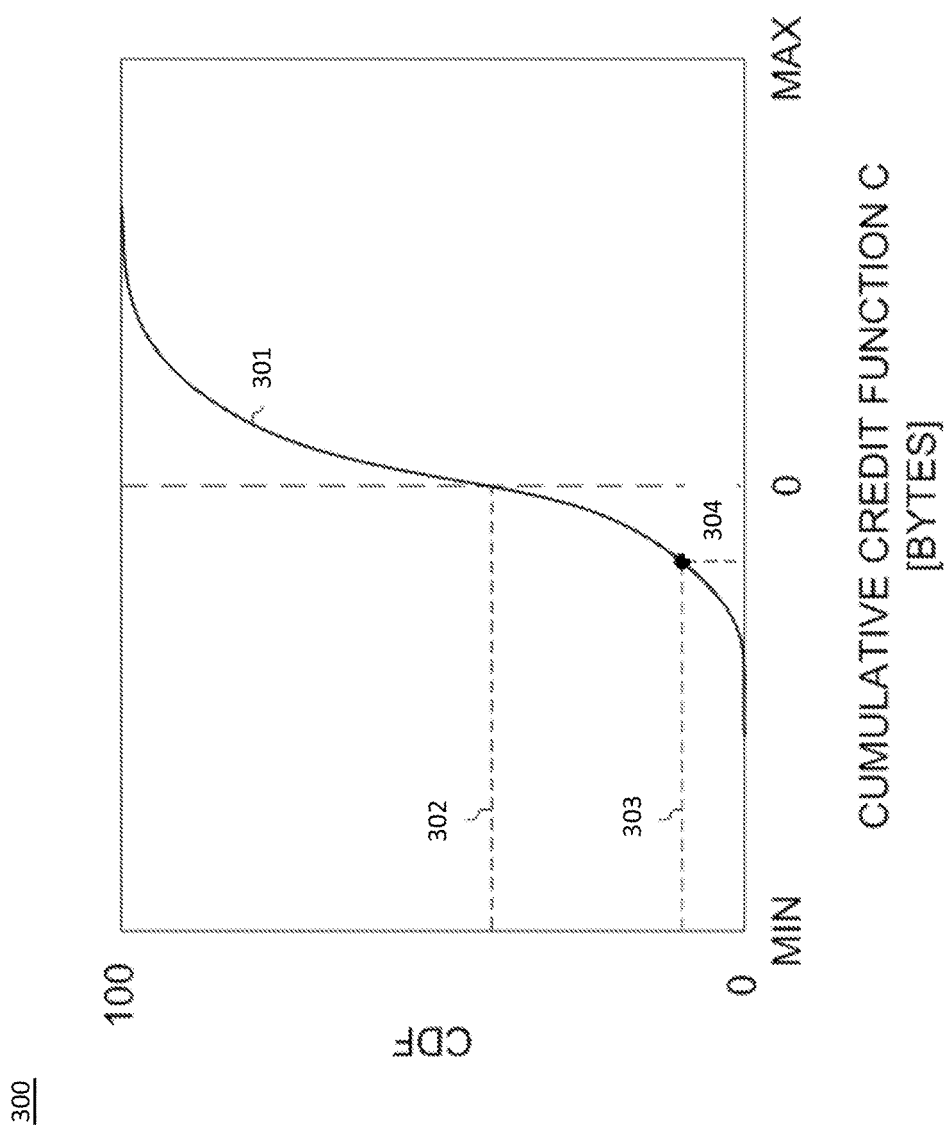
FIG. 3 is a graph illustrating a cumulative-distribution function (CDF) curve used to determine a fraction of content to pre-deliver to a user device.

For example, the input delivery buffer size may be constrained so that the requests for content are temporarily paused when the fill level reaches a maximum amount of delivered content, and not resumed again until the buffer content is drained (e.g., as content from the buffer is consumed by the playback) to a lower fill level. In such cases, the pre-delivery client may stop sampling the CCF until the requests for content resume. For example, the BytesConsumed(t) value may be held to its value when the requests for content pause, until the requests resume. In some embodiments, the pre-delivery client (via the content fraction module 220) constructs or generates a cumulative-distribution function (CDF) curve using the recorded CCF value data points. FIG. 3 is a graph 300 illustrating a cumulative-distribution function (CDF) curve used to determine a fraction of content to pre-deliver to a user device. The CDF curve is constructed using samples of the minimum (most negative) credit function value for each playback session (or, residual positive credit of a final CCF value if the credit function never goes negative during a playback event).

The graph 300 is constructed from accumulated samples of the credit function C(t), which are shown on the horizontal axis. The horizontal access may be scaled between the minimum negative credit value and maximum positive credit value, where the maximum possible credit value is the total size (e.g., total number of bytes) of the delivered content file or files. The minimum value may be similarly scaled.

The size of the delivered content files may not be constant, and instead vary arbitrarily from one content file to another, depending on various factors, including the playback length of the content, the encoding rate (for video content), and so on. In some embodiments, the horizontal axis credit sample values may be normalized according to the percentage [e.g., −100%, +100%] of the delivered content file size, so that all credit function samples fall on the same relative scale. In other words, a positive sampled value of C(t) equal to +100% would correspond to a playback scenario that begins with the first sample of C(t) equal to the entire content file size (e.g., a very fast network), a negative sampled value of C(t) equal to −100% would correspond to a playback scenario of the final sample of C(t) equal to the entire file length (e.g., a very slow network where no content was delivered during a playback event), and all other playback scenarios would fall between −100% and +100%.

When determining a C(t) value, the cumulative credit function (CCF) value resets to zero whenever the user or playback application initiates a playback event (e.g., at a delivery buffer state where zero bytes have been delivered and zero bytes have been consumed (e.g., played by the application). The logging of the credit function stops either when playback stops, or at a time equivalent to the continuous, interrupted playback time for the entire content file, assuming an average playback rate set by the content encoding process. In general, the bytes that are pre-delivered will not be counted when logging values of the CCF.

During some playback events, a user might stop the playback of content before the content file runs to completion. In such cases, when enough samples of the CCF are available for the playback event to reliably estimate an average delivery performance, the current values of the CCF may be used, or remaining values of the CCF may be extrapolated to the end of the playback session. For some atypical playback events, such as when a user abandons, pauses, or skips around during playback, the CCF log for the event may be deleted or ignored when generating the CDF curve for the user device.

In some scenarios, the file content delivery may outpace the playback rate so that the end of the file is delivered before the end of the playback interval. Typically, the logging of credit function samples ends when there is no remaining portion of the file to deliver. In some embodiments the number of samples of the credit function may be normalized by interpolating between the samples in order to give equal statistical weight to playback sessions that deliver the file content before the playback finishes. In other embodiments additional dummy credit function values may be prepended to the session set of samples in order to give the session equal statistical weight when constructing the CDF.

Thus, the CDF curve corresponds to instances where the streaming rate is above the playback rate when the CCF sample is trending positive, and below the playback rate when it is trending negative. Furthermore, when negative, the CDF curve corresponds to the size of the deficit of the playback. The content fraction module 220 utilizes such information when determining the fraction size of content to be pre-delivered, such as when a predicted playback event of the content may include intervals where a delivery network is expected to be unable to deliver content at a rate fast enough to avoid stalls during the playback event.

The vertical axis is scaled from 0 to 100 percent probability. For example, because the CDF curve depicts a cumulative distribution of C(t) values, the vertical axis represents a percentage of C(t) values that are equal to or less than a given C(t) value plotted on the horizontal axis. Although the credit function CDF curve 301 is shown as being continuous for illustration, it is composed of many discrete points (the credit function sample values). In some cases, interpolation may be used to estimate intermediary points. The CDF curve 301 and/or a similar table of the data points from the CDF curve 301, may be stored in a database that is accessed by the content fraction module 220 when determining the fraction size of the content to pre-deliver to the user device.

In general, a CDF curve for a user device (e.g., for a user associated with the device) may be built over time, as the user device streams or otherwise consumes content. Before a sufficient number of data points are captured (e.g., C(t) values for each playback event on the user device), the pre-delivery client may utilize a default CDF curve for the user device, a default fraction size, and/or one or more CDF curves associated with other users or user devices sharing similar characteristics to the user device. For example, when determining what fraction size of content to pre-deliver to a new or previously unknown user device, the pre-delivery client may utilize an average CDF curve for all user devices at a certain location that includes the new user device.

Thus, until enough C(t) values are recorded, the CDF curve 301 may not be a reliable statistical indicator, until a large number of samples associated with content playback sessions for a user device have been collected. Therefore, the pre-delivery client may utilize cumulative credit function samples from multiple user equipment terminals (e.g., cohort or similar terminals) that are collected and combined by a central server (e.g., the policy server 140) in order to construct a CDF curve 301 from the combined parallel operation of a plurality of user terminals 110 and their pre-delivery clients. In some embodiments, a pre-delivery client utilizes a specific user device's custom CDF curve 301 when determining content fraction sizes for pre-delivered content to the user device only after a threshold number (e.g., 100 playback events) of playback events have been recorded and used to build the custom CDF curve 301.

In some embodiments, as described herein, the content fraction module 220 utilizes the CDF curve when choosing or selecting a desired probability of playback success, which may be defined as a continuous start-to-finish playback of content without stalls due to no content being available to the application playing back the content, and when determining the corresponding pre-delivery fraction size for the content.

Thus, the content fraction module 220 may select a threshold 303 that corresponds to a pre-delivery buffer size with an associated no-stall probability. For example, a threshold of 10% on the CDF vertical axis corresponds to a 90% probability of no stall playback, assuming a pre-delivery file fraction of the corresponding horizontal axis value 304.

In some embodiments, the content fraction module 220 may determine the probability of playback success when there is no pre-delivered content within the delivery buffer at the commencement of a playback. This probability of playback success may be associated to where interpolated curve crosses the C(t)=0 vertical line 302. The CDF curve 301 indicates the past (e.g., recorded) network behavior in delivering content when users conducted their playback sessions.

In some embodiments, the content fraction module 220 may utilize information from multiple different CDF curves 301 for a single user device or user when determining the fraction of content to pre-deliver to the user device. For example, the content fraction module 220 may generate a CDF curve 301 for each of the following different playback scenarios or conditions:

Conditions associated with a type of access network (e.g., 2G, 3G, LTE, WiFi, and so on);

Conditions associated with a location of access network (e.g., Chicago, Las Vegas, Seattle, home WiFi, work WiFi, and so on);

Conditions associated with a network operator (e.g., home versus roaming);

Conditions associated with a size and/or encoding rate for the content to be consumed during a playback event;

Conditions associated with a user behavior during a playback event (e.g., mobile versus stationary), including predicted behaviors; and so on.

Thus, in some embodiments, the cumulative-distribution (CDF) curve 301 represents (1) a relationship between predicted playback percentages for new content to be pre-delivered to the user device over a certain network type and outputs of the delivery buffer cumulative credit function for content previously delivered to the user device over the certain network type, (2) a relationship between predicted playback percentages for new content encoded with a certain bit rate to be pre-delivered to the user device and outputs of the delivery buffer cumulative credit function for content encoded with the certain bit rate that was previously consumed by the user device, (3) a relationship between predicted playback percentages for new content to be pre-delivered to the user device at a certain location and outputs of the delivery buffer cumulative credit function for content previously delivered to the user device at the certain location, and so on.

Therefore, the content fraction module 220 may construct one or more CDF curves 301 from separate data sets by restricting the collection to playback events that share one or more playback conditions (e.g., playback events that access a 3G network in Chicago, or playback events for high definition content encoded with a bit rate of 8 megabits/second).

In some embodiments, the pre-delivery client collects C(t) samples when the serving network is called upon to stream content to the mobile user terminal during playback, and time, location, and/or user mobility during non-playback intervals is automatically factored out of the CDF curve measurements. For example, when a user device is connected to a work WiFi network during business hours, but does not consume content during those times, then the streaming performance over the work WiFi will not appear in the collected statistics, as it is not relevant for content playback determinations. Therefore, the CDF curve 301 adjusts to reflect statistics that correspond to the times and locations where a user actually consumes streaming media, such as videos, audio, and so on.

In some embodiments, the content fraction module 220 may consider the conditions and/or past performance of a delivery network during the actual playback event (e.g., during streaming delivery) of content when determining the size of the content fraction to pre-deliver to the user device. For example, the content fraction module may predict a delivery network and/or network conditions via which the content is to be delivered to the user device during a playback event of the content, and determine the fraction of the content available for pre-delivery based on the predicted delivery network used during the playback event, and the network's past delivery performance.

In some embodiments, the content fraction module 220 may utilize a default or common file fraction percentage, and then adjust that percentage based on subsequent playback performance. For example, the content fraction module 220 may monitor playback success rate for a user device, and when the success rate is too low, increase the pre-delivery percentage, and when the success rate is too high, decrease the pre-delivery percentage.

Thus, in some embodiments, the content fraction module 220 utilizes predicted network conditions and the cumulative-distribution (CDF) curve 301 to determine a fraction size to pre-deliver to a user device, as the CDF curve 301 represents a relationship between the amount of content to be pre-delivered and the probability based on past network delivery performance that the remainder of the content could be delivered by the network during a playback event, beginning with the pre-delivered content, enabling an uninterrupted playback session.

Referring back to FIG. 2, in some embodiments, the pre-delivery module 230 is configured and/or programmed to cause the determined fraction of the content available for pre-delivery to be delivered to the user device. For example, the pre-delivery module 230 causes the determined fraction content and/or other fractions or portions of the content, to be delivered to the user device, such as during one or more delivery windows (e.g., during occurrences of suitable network and/or device conditions) before receiving a playback or consumption request from a user associated with the user device to playback the content.

Figure 4:
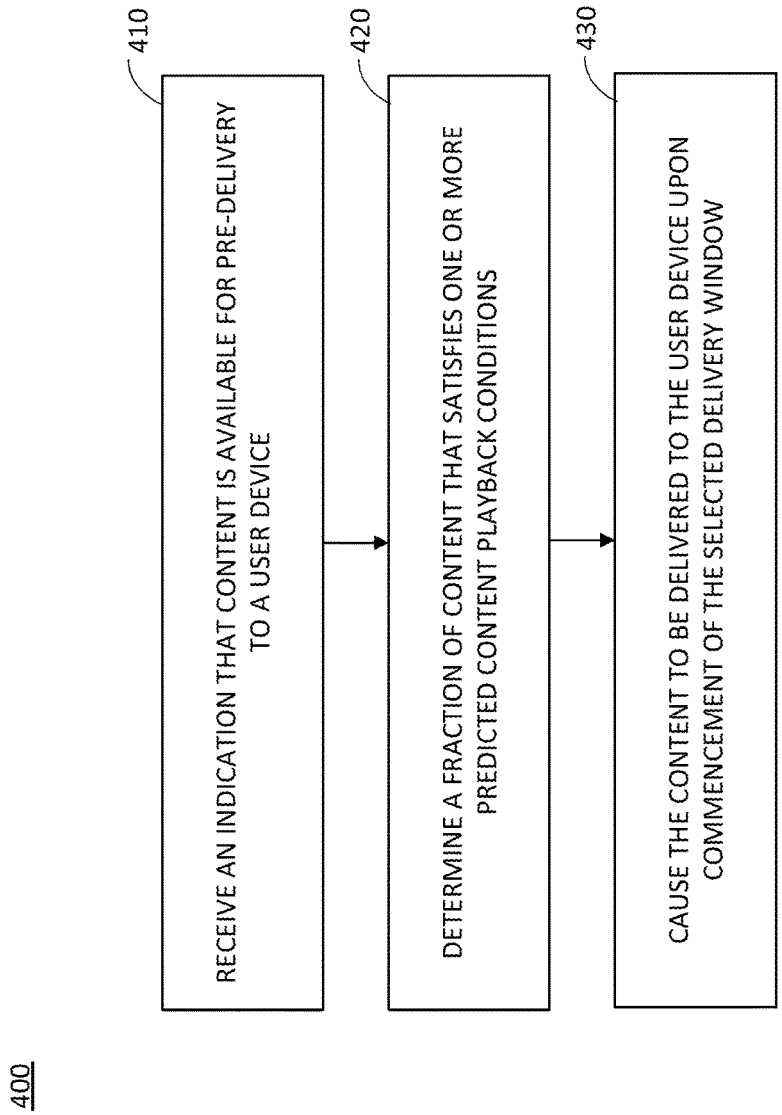
FIG. 4 is a flow diagram illustrating a method for determining a fraction of content to deliver to a user device.

As described herein, the fractional pre-delivery system 150 may perform various different methods, processes, and/or algorithms when determining a content fraction to pre-deliver to the user device 110. FIG. 4 is a flow diagram illustrating a method 400 for determining a fraction of content to deliver to a user device. The method 400 may be performed by the fractional pre-delivery system 150 and, accordingly, is described herein merely by way of reference thereto. It will be appreciated that the method 400 may be performed on any suitable hardware.

In operation 410, the fractional pre-delivery system 150 receives an indication that content is available for pre-delivery from a content server to a user device over a network. For example, the content module 210 may receive information from the policy server 140 that identifies content items available for pre-delivery to the user device 110, such as content items at the remote content servers 120a-c and associated with mobile applications 116 of the user device 110 that play multimedia content (e.g., video, audio, and so on), and/or may identify available content items as part of a pre-delivery client of the user device. As described herein, the pre-delivery of content is a delivery of content to the user device before a user of the user device inputs a request to retrieve or play back the content via the user device (e.g., pre-delivery of content anticipates the user selecting the content at a later, future, time).

In operation 420, the fractional pre-delivery system 150 determines a fraction of the content available for pre-delivery that satisfies one or more predicted content playback conditions. The one or more predicted content playback conditions or probabilities may include a probability that the content to be pre-delivered to the user device will be consumed by the user device during a playback event.

For example, the content fraction module 220 may determines minimum consumption credit function values for a consumption credit function that is based on a rate of consumption of content by the user device (e.g., when the user device is actively requesting content from a remote content source), generate a cumulative-distribution function (CDF) curve that plots the determined consumption credit function values versus uninterrupted playback probabilities associated with the user device, and select a fractional size of the content that is associated with a desired playback probability using the CDF curve.

In operation 430, the fractional pre-delivery system 150 causes the determined fraction of the content available for pre-delivery to be delivered to the user device. For example, the pre-delivery module 230 causes the determined fraction content and/or other fractions or portions of the content, to be delivered to the user device, such as during one or more delivery windows (e.g., during occurrences of suitable network and/or device conditions) before receiving a request from a user associated with the user device to playback the content.

Figure 5:
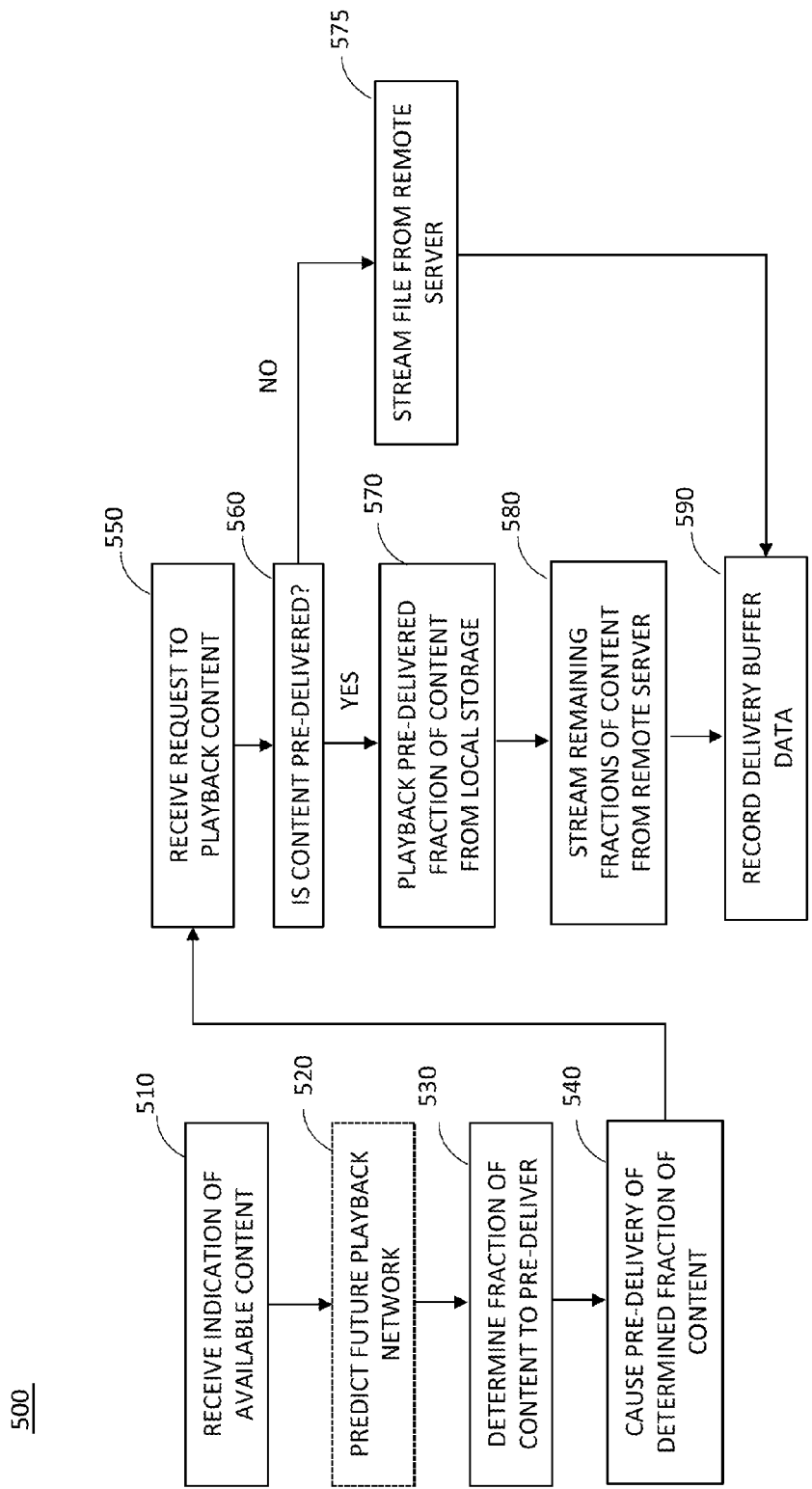
FIG. 5 is a flow diagram illustrating a method for pre-delivering fractions of content to a user device.

As described herein, the fractional pre-delivery system 150, via the pre-delivery client resident on the user device, causes the delivery of a determined fraction of content to a user device before receiving a request from a user associated with the user device inputs a request to play back the content. FIG. 5 is a flow diagram illustrating a method 500 for pre-delivering fractions of content to a user device. The method 500 may be performed by the fractional pre-delivery system 150 and, accordingly, is described herein merely by way of reference thereto. It will be appreciated that the method 500 may be performed on any suitable hardware.

In operation 510, the pre-delivery client receives an indication or otherwise detects that an online file is available for delivery. In operation 520, the pre-delivery client optionally determines which network type (if any) may deliver content to the user device during a future playback event.

As described herein, in some embodiments, the predicted type of delivery network that delivers content to the user device during a playback event may influence how large a fraction of the content should be pre-delivered, in order to achieve a desired playback performance during the playback event. For example, if a too small fraction of a content file is pre-delivered, the serving network may be unable to deliver the remaining portion of the file during playback in time to stay ahead of the already played portion of the file, resulting in a video stall which degrades the user viewing experience. Thus, if the future serving network type can be predicted, then the network's content delivery characteristics can also be similarly predicted (based on past behavior), and further the probability of a successful playback session for a given pre-delivery file fraction can be estimated.

Therefore, by tracking the usage of device applications and networks by users, the fractional pre-delivery system 150 may identify and exploit patterns of usage for a user device. For example, the fractional pre-delivery system 150 may monitor and record which networks delivery content to a user device during playback events over a long period of time (e.g., weeks or months). For example, a user device may connect to several types of networks (e.g., WiFi, LTE, 3G, 2G, and so on), over a period of time, and time and/or location-based patterns of connection may be realized. For example, a user device associated with a user who on a weekday rides a bus to work from 8:00 AM to 8:30 AM, is at work from 8:30 to 6:00 PM, rides a bus back home from 6:00 PM to 6:30 PM, and is home from 6:30 PM to 8:00 AM the next morning may reflect the following network usage pattern:

| Time of Day | Access Network |
| --- | --- |
| 8:00 AM to 8:30 AM | LTE |
| 8:30 to 6:00 PM | Work WiFi |
| 6:00 PM to 6:30 PM | LTE |
| 6:30 PM to 11:59 PM | Home WiFi |

In some embodiments, the fractional pre-delivery system 150 may filter various types of noise in the monitored data on a relative frequency of network connectivity of a given network type (e.g., by maintaining counts for each network type and selecting the highest-count entry for a given time of day). Of course, other filtering policies may be used to determine the predominant or most relevant network type for a given time of day and/or location of playback event.

In some embodiments, the fractional pre-delivery system 150 may monitor and/or track patterns that reflect time differences between the pre-delivery of content and consumption activity (e.g., playback events) associated with the pre-delivered content. For example, the fractional pre-delivery system 150 may maintain a watch or consumption activity timeline that represents recorded intervals where the pre-delivered file content is accessed, triggered by a user request to view the pre-delivered file content. For example, playback event start times may be recorded and stored locally on the user device or at a remote location, and deleted after a set interval (e.g., 30 days).

In some embodiments, the fractional pre-delivery system 150 may filter various types of noise based on relative frequency of view counts at a particular time of day (e.g., by maintaining counts for each network type and selecting the highest count entry for a given time of day). Of course, other filtering policies may be used to determine the predominant or most relevant watch intervals for a given time of day.

Therefore, once a data collection interval (e.g., 30 days) finishes and sampling data was collected, the fractional pre-delivery system 150 may predict, at or before an initial fraction of a content file is to be pre-delivered, what the probable or expected delivery network will be when a user, at a later time, selects the content for consumption (e.g., initiates a playback event of the content).

For example, the fractional pre-delivery system 150, therefore, may utilize the following example algorithm when determining a fraction size of content to pre-deliver to a user device that is based on a predicted delivery network during a playback event of the content:

```
IF (a content file is published and selected for pre-delivery)
    (determine the next Watch Window time and duration: Tw, Dw)
    (determine the least capable serving network N during Dw
    (determine current pre-delivery size S rule for network N)
    (pre-deliver content file fraction S into local cache)
    ...
    IF (user did not watch pre-delivery content file in most recent
    Watch Window)
        (determine the next Watch Window time and duration: Tw, Dw)
        (determine the least capable serving network N during Dw
        (determine current pre-delivery size S rule for network N)
        IF (at least S not already pre-delivered)
            (pre-deliver content file fraction S into local user device
storage).
```

In some embodiments, the fractional pre-delivery system 150 may consider other network factors, characteristics, or metrics when determining a content fraction that is based on delivery networks predicted to be utilized during playback events. Examples of network condition metrics that may be considered by the fractional pre-delivery system 150 may include the serving network type (e.g., 3G, LTE, WiFi, and so on), the serving network operator (e.g., "Global Mobile Telecom"), the roaming status (e.g. "Home, Roaming"), the user location (e.g., geo lat/lon or network attachment/base-station ID), the time of day (e.g., 2:45 pm UTC), the network performance (e.g., 1400 kbps average data throughput), the user account status (e.g., "active subscriber Global Mobile Telecom"), the content file provider (e.g. "Mobile Online Video Inc."), the content file delivery status (e.g. "immediate, standard, anytime"), and so on. Further details regarding the utilization of delivery network conditions may be found in commonly-assigned U.S. patent application Ser. No. 14/506,492, filed on Oct. 3, 2014, entitled CONDITIONAL PRE-DELIVERY OF CONTENT TO A USER DEVICE, which is hereby incorporated by reference in its entirety.

Referring back to FIG. 5, in operation 530, the pre-delivery client determines the pre-delivery fraction based on the various methods and processes described herein, such as by using an algorithm that estimates the probability of playback success and its corresponding pre-delivery fraction. In operation 540, the pre-delivery client causes delivery of the pre-delivery fraction to the user device cache memory from an online content server, such as one of servers 120*a-c*.

At a later time, in operation 550, the pre-delivery client receives a request from a user of the user device to playback the content file. For example, the user may launch a mobile application that presents video or audio content, and make a selection of one or more video files for playback. In operation 560, the pre-delivery client determines whether the file is locally stored (e.g., has a fraction of the content been pre-delivered?). When a fraction of the content file is locally stored, in operation 570, the pre-delivery client causes the playback to begin using the locally cached fraction of the content. In operation 580, during playback of the pre-delivered fraction (during the playback event of the content), the pre-delivery client begins delivering the remainder of the content fie, so that playback will continue without pause after the pre-delivered fraction has been played back.

When a fraction of the content is not locally stored, the pre-delivery client, in operation 575, causes an online content server to deliver the content via streamed delivery (e.g., played out concurrently with the delivery of the file contents). In either case, the pre-delivery client, in operation 590, collects and record the network delivery performance and playback event performance during the delivery/playback of the non-pre-delivered fraction of the content file (e.g., the content delivered during operation 575 or 580). As described herein, the collected statistics are utilized by the content fraction module 220 when estimating a the successful playback probability for future file deliveries having a determined particular pre-delivery fraction.

Figure 6:
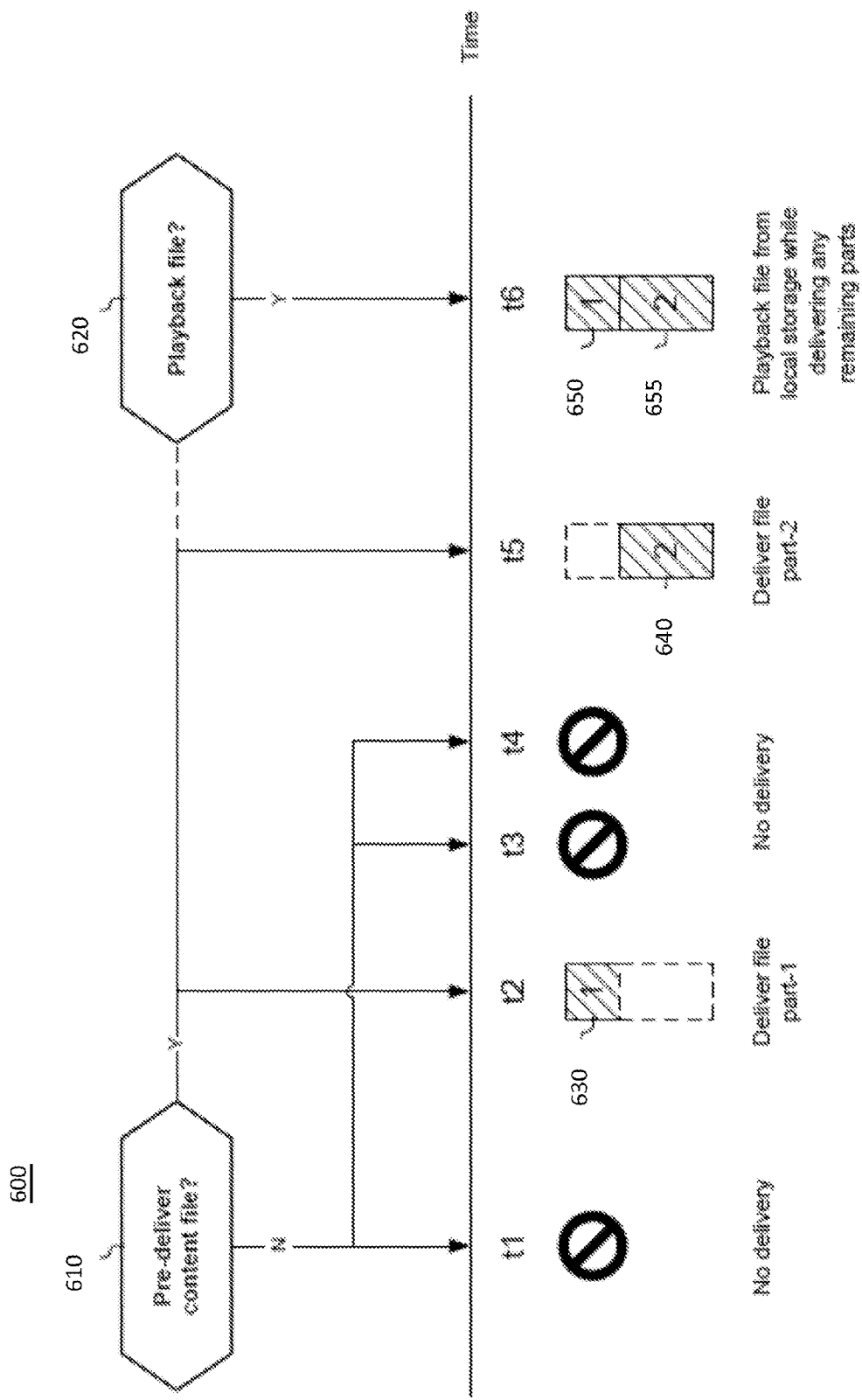
FIG. 6 is a block diagram illustrating the pre-delivery of fractions of content to a user device.

In some embodiments, the fractional pre-delivery system 150 identifies conditions associated with content delivery networks and applies pre-delivery rules based on the conditions to determine a fraction to pre-deliver and an appropriate or suitable delivery window within which to pre-deliver the determined fraction and other portions of the content to user devices. FIG. 6 is a block diagram 600 illustrating the pre-delivery of fractions of content to a user device.

At a time t1, the client defers the pre-delivery of content, and consequently no file delivery action occurs. At a time t2, the conditional pre-delivery system 150 determines the network conditions meet the criteria for delivery of the determined fraction 630 of the selected file. For example, the size of the file part may be determined by the processes described herein.

At times t3 and t4 the conditional pre-delivery system 150 determines the network conditions do not meet the criteria for delivery of the remaining portions of the file, and defer further pre-delivery of the remaining portions of the file. At a time t5, the conditional pre-delivery system 150 determines to pre-deliver a second portion 640 of the file. Thus, FIG. 6 depicts an example delivery window during which to pre-deliver content items as a window that includes time t2 and time t5 (e.g., multiple intermittent times within the sequence where pre-delivery conditions are met).

Once pre-delivery is complete, at a time t6 (e.g., some arbitrary time later) a user requests access to the file via an application running on the user device. Playback of the file begins using the locally stored content, and, if the entire content file has not already been delivered, the remainder is downloaded in parallel with the playback process.

As described herein, in some embodiments, the fractional pre-delivery system 150 receives an indication that content is available for pre-delivery from a content server to a user device over a network, determines a fraction of the content to be pre-delivered to the user device that is based on a probability that the content to be pre-delivered to the user device will be consumed by the user device during an uninterrupted playback event and/or based on a prediction of a delivery network via which the content is to be delivered to the user device during the playback event, and causes the determined fraction of the content available for pre-delivery to be delivered to the user device.

The fractional pre-delivery system 150, therefore, determines a suitable fraction of content to pre-deliver to a user device that is based on delivering enough of the content to provide for a uninterrupted playback experience of the content, without unnecessarily delivering content to the user device that is predicted to never be consumed during a playback event.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method, comprising:
   receiving an indication that first content is available for pre-delivery from a content server to a user device over a network;
   determining minimum consumption credit function (CCF) values based on a rate of consumption of second content by the user device and a rate of delivery of the second content to the user device from a remote content source, the second content being previously delivered to the user device;
   generating a cumulative-distribution function (CDF) curve that plots the determined minimum CCF values versus uninterrupted playback probabilities associated with the user device;
   selecting a fraction of the first content that is associated with the desired uninterrupted playback probability using the CDF curve; and
   causing the converted fraction of the first content to be delivered to the user device.

2. The method of claim 1, wherein the second content includes content of a certain file size of the first content.

3. The method of claim 1, wherein the the second content includes content previously delivered to the user device over the same network type as a network type over which the fraction of the first content is delivered.

4. The method of claim 1, wherein the second content includes content encoded with the same bit rate as the first content.

5. The method of claim 1, wherein the second content includes content previously delivered to the user device at a certain location of the user device during a playback event of the first content.

6. The method of claim 1, further comprising:
   predicting a delivery network via which the content is to be delivered to the user device during a playback event of the content,
   wherein the CDF curve is generated based on the predicted delivery network used during the playback event.

7. The method of claim 1, further comprising:
   predicting one or more delivery network conditions via which the content is to be delivered to the user device during a playback event of the content,
   wherein the CDF curve is generated based on the predicted one or more delivery network conditions associated with a delivery network used during the playback event.

8. The method of claim 1, wherein the determined fraction of the content is adjusted based on a current playback performance of the first content by the user device.

9. The method of claim 1, wherein causing the determined fraction of the first content to be delivered to the user device includes causing the determined fraction to be delivered to the user device before the user device receives a request to consume the determined fraction.

10. The method of claim 1, further comprising:
    selecting the second content to correspond to content previously delivered to the user device at a location where the user device is predicted to play back the first content, and to content played back by the user device at a time when the user device is predicted to play back the first content.

11. The method of claim 1, wherein the user device is a first user device, and
    wherein the minimum consumption credit function (CCF) values are further based on a rate of consumption of third content by a second user device and a rate of delivery of the third content to the second user device from a remote content source, the third content corresponding to content previously delivered to the second user device at a location where the first user device is predicted to play back the first content, and to content played back by the second user device at a time when the user device is predicted to play back the first content.

12. A system supported by a mobile device, the system comprising:
    a content module that receives an indication that first content is available for pre-delivery from a content server to a user device over a network;
    a content fraction module that determines a fraction of the first content that is associated with a desired uninterrupted playback probability; and
    a pre-delivery module that causes the determined fraction of the first content to be delivered to the user device,
    wherein the content fraction module:
    determines minimum consumption credit function (CCF) values based on a rate of consumption of second content by the user device and a rate of delivery of the second content to the user device from a remote content source, the second content being previously delivered to the user device;
    generates a cumulative-distribution function (CDF) curve that plots the determined minimum CCF values versus uninterrupted playback probabilities associated with the user device; and
    selects a fraction of the first content that is associated with the desired uninterrupted playback probability using the CDF curve.

13. The system of claim 12, wherein the second content includes content of a certain file size of the first content.

14. The system of claim 12, wherein the second content includes content previously delivered to the user device over the same network type as the network type over which the first content is delivered.

15. The system of claim 12, wherein the second content includes content encoded with the same bit rate as the first content.

16. The system of claim 12, wherein the second content includes content previously delivered to the user device at a certain location of the user device during a playback event of the first content.

17. The system of claim 12, wherein the content fraction module determines the minimum consumption credit function values for the consumption credit function when the user device is actively requesting the first content from a remote content source.

18. The system of claim 12, wherein the content fraction module:
predicts a delivery network via which the first content is to be delivered to the user device during a playback event of the content,
wherein the CDF curve is generated based on the predicted delivery network used during the playback event.

19. A non-transitory computer-readable storage medium whose contents, when executed by a computing device, cause the computing device to perform operations, comprising:

receiving an indication that first content is available for pre-delivery from a content server to a user device over a network;
determining minimum consumption credit function (CCF) values based on a rate of consumption of second content by the user device and a rate of delivery of the second content to the user device from a remote content source, the second content being previously delivered to the user device over a delivery network via which the first content is predicted to be delivered during a playback event;
generating a cumulative-distribution function (CDF) curve that plots the determined minimum CCF values versus uninterrupted playback probabilities associated with the user device;
selecting a fraction of the first content that is associated with the desired uninterrupted playback probability using the CDF curve; and
causing the determined fraction of the first content to be delivered to the user device.

* * * * *